United States Patent

Smith

[15] 3,635,743
[45] Jan. 18, 1972

[54] REINFORCING SILICA FILLER
[72] Inventor: Alfred H. Smith, Jonesville, N.Y.
[73] Assignee: General Electric Company
[22] Filed: Jan. 6, 1969
[21] Appl. No.: 789,352

[52] U.S. Cl. ......................106/288 Q, 106/308 N, 106/309
[51] Int. Cl. ...........................................C08h 17/04, C09c 1/28
[58] Field of Search ......................106/288 O, 308 O, 308 N; 260/448.2 N

[56] References Cited

UNITED STATES PATENTS

| | | | |
|---|---|---|---|
| 2,742,378 | 4/1956 | Le Grotenhuis | 117/76 |
| 2,938,009 | 5/1960 | Lucas | 260/37 |
| 3,024,126 | 3/1962 | Brown | 106/308 |

FOREIGN PATENTS OR APPLICATIONS 1,024,234  3/1966  Great Britain

*Primary Examiner*—Tobias E. Levow
*Assistant Examiner*—J. V. Howard
*Attorney*—Donavon L. Favre, Frank L. Neuhauser and Oscar B. Waddell

[57] ABSTRACT

An improved reinforcing silica filler is made by first treating a reinforcing silica filler with ammonia and then treating the filler with hexamethyldisilazane. The treated filler when used in a composition containing a silanol end-stopped polydimethylsiloxane curable to a silicone rubber, provides improved shelf stability of the curable composition and also provides improved strength in the cured composition.

10 Claims, No Drawings

REINFORCING SILICA FILLER

This invention relates to a process for producing reinforcing silica fillers and to a reinforcing silica filler produced thereby. The reinforcing silica fillers of the present invention find utility in curable silanol-containing silicone compositions which form elastomers. Curable silicone compositions that contain the fillers of the present invention show improved shelf stability and freedom from structuring as compared to prior art fillers. The elastomers produced from the curable compositions which contain the fillers of the present invention exhibit improvements in strength, both tear and tensile, over the silicone elastomers of the prior art.

The process of the present invention comprises contacting at a temperature of about 15° C. to about 170° C., (a) a finely divided silica having a surface area of at least about 50 square meters per gram and containing at least about 0.2 weight percent of absorbed water based upon the weight of the silica with (b) a nitrogen-containing compound selected from the group consisting of ammonia, primary amines, and aminoxy compounds; and contacting the silica at a temperature of from about 20° C. to about 150° C. with from 3 to 25 percent by weight based upon the weight of the silica of a silylating agent of the formula $(R_3Si)_aZ$, where each R is individually selected from the group consisting of mononuclear and binuclear aryl radicals such as phenyl, tolyl, xylyl, naphthyl, etc.; halogenated mononuclear and binuclear aryl radicals such as chlorophenyl, chloronaphthyl, etc.; mononuclear aryl lower alkyl radicals having from 1 to 8 carbon atoms per alkyl group such as benzyl, phenylethyl, etc.; lower alkyl radicals having from 1 to 8 carbon atoms such as methyl, ethyl, propyl, butyl, pentyl, hexyl, heptyl, octyl; lower alkenyl radicals having from 2 to 8 carbon atoms such as vinyl, allyl, 1-propenyl; halo lower alkyl radicals having from 1 to 8 carbon atoms such as chloropropyl, trifluoropropyl; cycloalkyl radicals such as cyclobutyl, cyclopentyl, cyclohexyl; $a$ is an integer equal to 1 or 2 and Z is a radical selected from —OH, —NRX, —ONR$_2$, —SR,

—O—,

and —S—, where X is selected from the group consisting of H and R, where R is as above defined and is preferably H, lower alkyl or cycloalkyl.

The filler of the present invention produced by the above process is a treated pyrogenic silica filler having a surface area of at least 50 square meters per gram which is substantially free of infrared absorbance at 3,760 cm.$^{-1}$, which filler contains from 1 to 20 percent by weight of chemically combined triorganosiloxy units of the formula $R_3SiO$, where R is as above described, and is preferably methyl.

The pyrogenic silica filler utilized in the practice of this invention has a surface area of at least 50 square meters per gram and preferably 150 to 500 square meters per gram. The pyrogenic filler can be made from silica filler produced by burning silanes, for example silicon tetrachloride, trichlorosilane, etc., as taught by Spialter et al. U.S. Pat. No. 2,614,906, Hugh et al. U.S. Pat. No. 3,043,660, etc.

Provided sufficient water is present, either as water absorbed on the surface of the filler resulting from normal contact with atmospheric moisture or added externally such as from 0.2 to 2 percent by weight of water, based on the weight of the silica filler, such filler may be used directly in the practice of the present invention. The filler at this point may be treated with ammonia prior to further treatment or treated with a cyclic siloxane in accordance with the teachings of Lucas, U.S. Pat. No. 2,938,009, assigned to the same assignee as the present invention, or with other cyclic siloxanes according to the teachings of the prior art, e.g., U.S. Pat. No. 3,334,062 of Brown.

Preferably, the above-described filler is pretreated with ammonia prior to silylation, however, other ammonia derivatives such as primary amines, isopropyl amines; or hydroxylamine compounds such as diethylhydroxylamine may be used for the pretreatment. A further treatment with an alkylcyclopolysiloxane such as octamethylcyclotetrasiloxane prior to such silylation and either before or after the pretreatment is particularly preferred. The preferred pretreating agent to be used in conjunction with the alkylcyclopolysiloxane is ammonia.

For example, untreated silica filler made by burning a chlorosilane can be contacted with at least 0.25 percent by weight of ammonia by vigorously agitating the filler in an ammonia atmosphere at atmospheric pressures at temperatures from about 20° to about 150° C. Generally, the time of treatment may range from about 15 minutes to 7 days, or, if desired, the filler may be stored for an unlimited amount of time in an ammonia atmosphere. The resulting silica filler after such contact with ammonia can be further treated with an alkylcyclopolysiloxane in accordance with standard techniques as described by the aforementioned Lucas patent. Alternatively, the treatment of the filler with the aforementioned alkylcyclopolysiloxane can precede the contact with ammonia. The pressure used in the ammonia treatment is not critical and can vary from subatmospheric to superatmospheric, but is preferably done at atmospheric pressure.

After the filler has been contacted with ammonia and optionally the alkylcyclopolysiloxane, it can be silylated with one or more silylating agents at temperatures of from about 20° to about 150° C. The optimum silylating conditions will depend upon the particular choice of silylating agent employed. In instances where the silica filler has been contacted with alkylcyclopolysiloxane, effective results can be achieved when the silica is silylated to provide for as little as 1 percent by weight based on the weight of untreated silica filler employed of chemically combined triorganosiloxy units.

Contact of the silica filler with alkylcyclopolysiloxane can be effected in accordance with the teaching of the aforementioned Lucas patent. Excess alkylcyclopolysiloxane can be stripped from the surface of the silica to achieve a treated silica having absorbed or chemisorbed diorganosiloxy units such as dimethylsiloxy. The preferred treatment will provide for from 5 to 10 percent by weight of permanently associated dimethylsiloxy units if octamethylcyclotetrasiloxane is employed.

In the absence of treating the filler with alkylcyclopolysiloxane, it has been found that about 6 to 20 percent by weight of chemically combined triorganosiloxy units of formula 1 can be employed. In instances where the triorganosiloxy units are trimethylsiloxy units, optimum results can be achieved with from 6 to 12 percent of trimethylsiloxy units be weight based on the weight of the untreated filler.

Silylating agents which can be employed in the above process include, for example, triorganosilylmercaptans, triorganosilylacylates, triorganosilylamines for example, trimethylsilylisopropylamine, trimethylsilylamine, dimethylphenylsilylamine, dimethylvinylsilylamine, etc.; triorganosilylaminoxy compounds, such as diethylaminoxytrimethylsilane, diethylaminoxydimethylphenylsilane; silylating compounds shown by Klebe, U.S. Pat. No. 3,397,220, assigned to the same assignee as the present invention. There also can be employed disilyl compounds such as disiloxanes for example, hexamethyldisiloxane, 1,1,3-divinyltetramethyldisiloxane, 1,3-diphenyltetramethyldisiloxane, etc.; silazanes such as hexamethyldisilazane, 1,3-diphenylhexamethyldisilazane, etc. The preferred silylating agents are the triorganosilylamines and the silazanes, particularly the silazanes. The silylation is accomplished by contacting the ammonia pretreated silica filler with one of the above-mentioned silylating agents at 20° to 150° C. The treating time is not critical and generally can range from about 1 hour to about 7 days, or the filler may be mixed with the silazane and stored for an indefinite period.

The treated fillers of the present invention have particular utility in two-package room temperature vulcanizing (RTV) compositions which are cured by the cross-linking of silanol-stopped polydiorganosiloxane fluids with polyfunctional cross-linking agents. The fillers are valuable in this application because when they are used in combination with the silanol-stopped fluid they do not cause an appreciable thickening of the fluid nor do they cause structuring when higher filler loadings are employed. The ammonia pretreatment of the fillers of the present invention results in a uniformity of filler properties not found in the prior art. The properties of the fillers are measured by their performance when used in two-package RTV's of the aforedescribed type, and in conventional one-package silicon RTV's.

The process of the present invention is not only valuable in that it is useful in the production of fillers having superior properties, but is also an important contribution to the art in that the amount of silylating agent required to treat a given amount of filler is significantly reduced. For example, if a filler is pretreated with ammonia prior to silylation, far less silylating agent is required that if no ammonia pretreatment is employed. If the ammonia pretreatment is followed by an alkylcyclotetrasiloxane treatment, a further significant reduction in the amount of silylating agent is noted.

The following examples are illustrative of the practice of the present invention and are not to be construed as limiting the invention which is properly delineated in the appended claims.

EXAMPLE 1

Pyrogenic silica filler having a surface area of about 200 square meters per gram and containing 0.75 percent by weight of absorbed water was treated with octamethylcyclotetrasiloxane in accordance with the teaching of Lucas U.S. Pat. No. 2,938,009. The resulting treated filler was then highly agitated for 3 hours at 25° C. in an ammonia atmosphere. Hexamethyldisilazane, 7½ percent by weight based on the filler, was admixed with the filler and the resulting mixture was then heated to 130° C. for 4 hours. About 0.5 percent of water based on the weight of the filler was added and the mixture was vigorously agitated for an additional 2 hours at 130° C. The treated filler was then dried in an oven for 24 hours at 150° C. to obtain a filler free of infrared absorbance at 3,760 cm.$^{-1}$, and containing about 2.2 percent by weight of chemically combined trimethylsiloxy units.

A mixture of 25 parts of the above-treated pyrogenic silica filler and 100 parts of a silanol-terminated polydimethylsiloxane having a viscosity of about 3,000 centipoises at 25° C. was prepared by incrementally adding the filler to the organopolysiloxane fluid with stirring. After the filler had been completely added, there was obtained a silanol-containing polydimethylsiloxane composition having a viscosity of about 400,000 centipoises at 25° C.

The above procedure was repeated, except that in place of the pyrogenic silica filler utilized in the practice of the invention, there was employed a pyrogenic silica filler treated with octamethylcyclotetrasiloxane in accordance with the above-described Lucas patent. The pyrogenic silica filler treated with octamethylcyclotetrasiloxane was added incrementally in the same manner. There was obtained a silanol-containing polydimethylsiloxane composition consisting of 25 parts of filler, per 100 parts of silanol-terminated polydimethylsiloxane. It had a viscosity of about 410,000 centipoises at 25° C. The time required to mix the octamethylcyclotetrasiloxane-treated filler and fluid was about 3 times the period of time needed to mix the same silanol-containing polydimethylsiloxane and filler treated in accordance with the practice of the invention.

Another silanol-containing polydimethylsiloxane composition was made by adding incrementally to 100 parts of the above silanol-terminated polydimethylsiloxane, 25 parts of untreated pyrogenic silica filler. It was apparent, however, that as soon as about 8 parts of the filler was added, the mixture began to structure. It became extremely difficult to stir. In order to completely incorporate all of the filler into the silanol-terminated polydimethylsiloxane, the mixture was treated with steam for 2 hours at 115° C. There was obtained a silanol-containing polydimethylsiloxane composition having a viscosity of about 420,000 centipoises at 25° C.

Portions of the respective silanol-containing polydimethylsiloxane compositions were observed over a period of several months to determine if any of the mixtures increased in viscosity.

The following table shows the results obtained, where "-blend" is the mixture of silica filler and silanol fluid, Smith is the composition of the present invention, Lucas is the composition containing silica filler treated with octamethylcyclotetrasiloxane and control is the composition containing untreated silica filler, "viscosity" represents initial viscosity, "months" is the shelf period, and "percent increase" is the increase in viscosity over the initial viscosity:

| Blend | Viscosity | Months | % Increase |
|---|---|---|---|
| Smith | 400,000 | 6 | 20 |
| Lucas | 410,000 | 4 | gelled |
| Control | 420,000 | 3 | gelled |

EXAMPLE 2

A treated pyrogenic silica filler was prepared by contacting a fume silica having a surface area of 200 square meters per gram and containing 1 percent by weight of absorbed water with ammonia for 3 hours at 25° C., while the filler was vigorously agitated. The filler was treated with hexamethyldisilazane by adding hexamethyldisilazane to the silica filler until a mixture containing about 20 percent by weight of hexamethyldisilazane was formed. The mixture was heated with agitation for 3 hours at 130° C. and then dried for 24 hours at 150° C. The resulting pyrogenic silica filler was found to be free of infrared absorbance at 3,760 cm.$^{-1}$, and had about 7 percent by weight of chemically combined trimethylsiloxy units based on the weight of filler.

A silanol-containing polydimethylsiloxane composition having a viscosity of 810,000 centipoises at 25° C. was made by mixing together 100 parts of a silanol-terminated polydimethylsiloxane having a viscosity of about 102,000 centipoises at 25° C., 35 parts of the treated pyrogenic silica filler and 57 parts of a trimethylsiloxy chain-stopped polydimethylsiloxane fluid having a viscosity of about 50 centipoises at 25° C.

A curable composition was prepared by adding 2.4 parts of phenyltriethoxysilane to 80 parts of the above silanol-containing polydimethylsiloxane composition along with 0.4 part of dibutyl tin dilaurate. The mixture was poured onto a chrome-plated steel mold to a thickness of 0.075 inch and allowed to cure for 96 hours at 25° C. A portion of the silanol-containing polydimethylsiloxane composition also was observed over a period of several months to determine whether it experienced any change in viscosity.

The above procedure was repeated except that in place of the pyrogenic silica filler utilized in making the silanol-containing polydimethylsiloxane composition of the present invention, there was employed equal parts by weight of a pyrogenic silica filler treated in accordance with the method of Lucas, utilizing octamethylcyclotetrasiloxane. The initial viscosity of the resulting silanol-containing polydimethylsiloxane composition was found to be 750,000 centipoises at 25° C. A portion of the silanol-containing polydimethylsiloxane also was observed over a period of several months under the same conditions used with the silanol-containing polydimethylsiloxane made in accordance with the invention. A curable composition also was made following the previously described procedure, except there was substituted for the 35 parts of the pyrogenic silica filler contacted with ammonia and thereafter treated with hexamethyldisilazane, a pyrogenic silica filler that had been treated with octamethylcyclotetrasiloxane.

The table below shows the shelf results obtained with the respective compositions where the terms are as previously defined:

|  | Viscosity | Months | % Increase |
|---|---|---|---|
| Smith | 810,000 | 4 | 13 |
| Lucas | 750,000 | 2 | gelled* |

*20,000,000 centipoises at 25° C.

The following table shows the results obtained with cured samples of the respective curable compositions, where "H" is hardness (shore A), "T" is tensile (p.s.i.), "E" is elongation (percent) and "T'" is tear (p.i.):

|  | H | T | E | T' |
|---|---|---|---|---|
| Smith | 27 | 610 | 700 | 125 |
| Lucas | 30 | 580 | 550 | 48 |

EXAMPLE 3

A silanol-containing organopolysiloxane composition was made in accordance with the practice of the invention by mixing 200 parts of the silazane-treated pyrogenic silica filler of example 2, and 937 parts of a silanol-containing organopolysiloxane. The silanol-containing organopolysiloxane consisted of 545 parts of a silanol-terminated poyldimethylsiloxane having a viscosity of 102,000 centipoises at 25° C., 256 parts of a tertiary butoxy containing polydimethylsiloxane having a viscosity of about 3,000 centipoises at 25° C., which was terminated with a mixture of silanol radicals and tertiary butoxy radicals, and 136 parts of a silanol-containing process aid. The silanol-containing process aid consisted essentially of chemically combined methylsiloxy units, dimethylsiloxy units, and trimethylsiloxy units, as described in Beers U.S. Pat. No. 3,382,205, assigned to the same assignee as the present invention. The resulting silanol-containing organopolysiloxane composition had an initial viscosity of about 650,000 centipoises at 25° C. After a shelf period of 4 months at 25° C., its viscosity increased about 5 percent.

There was added to 80 parts of the above silanol-containing organopolysiloxane composition, about 2½ parts of ethylsilicate and 0.3 part of stannous octoate. A portion of the resulting curable composition was poured onto a chrome-plated steel mold at 25° C. After 96 hours there was obtained a tack-free sheet. A slab was cut from the tack-free sheet. It had a tensile of 700 (p.s.i.) and elongation of 525 (percent), a tear of 173 (p.i.), and a durometer of 41.

EXAMPLE 4

A silanol-containing organopolysiloxane composition was prepared in accordance with the practice of the invention consisting essentially of 200 parts of a pyrogenic silica filler, 545 parts of a silanol-terminated polydimethylsiloxane fluid having a viscosity of about 99,000 centipoises at 25° C., and 300 parts of a polydimethylsiloxane fluid having a viscosity of 500 centipoises at 25° C., and a mixture of terminal trimethylsiloxy units and silanol chain-stopping units. The pyrogenic silica filler was prepared by contacting a fume silica having a surface area of about 325 square meters per gram and containing 0.5 percent by weight of absorbed water which had been treated with octamethylcyclotetrasiloxane, with ammonia at a temperature of about 25° C. for 1½ hours. The resulting pyrogenic silica filler was mixed with 7½ percent by weight of hexamethyldisilazane based on the weight of silica filler. The resulting mixture was agitated at a temperature of 130° C. for 3 hours. About 0.5 percent by weight of water based on the weight of mixture was added and the mixture was then heated for about an additional 2 hours at 130° C. and dried for 24 hours at 150° C. in a circulating air oven. An infrared spectrum of the filler showed it had about 2.2 percent by weight of chemically combined trimethylsiloxy units based on the filler weight and that it was free of infrared absorbance at 3,760 cm.$^{-1}$.

The resulting blend of pyrogenic silica filler and silanol-containing organopolysiloxane had a viscosity of 120,000 centipoises at 25° C. A portion of the silanol-containing organopolysiloxane composition was found to have substantially the same viscosity after a 4-month shelf period at 25° C.

A curable composition was prepared with the above-described silanol-containing organopolysiloxane composition by adding 2.25 parts of ethylsilicate and 0.2 part of dibutyl tin dilaurate to 100 parts of the silanol-containing organopolysiloxane composition. The resulting curable mixture cured at room temperature to an elastomeric product after 96 hours. It had a tensile (p.s.i.) of 850, an elongation (percent) of 470, a tear (p.i.) of 175, and a durometer of 47.

EXAMPLE 5

A treated silica filler was made by subjecting 100 parts of fume silica having a surface area of 200 square meters per gram and containing 1 percent by weight of absorbed water to an ammonia atmosphere for 2 hours at 30° C. and at atmospheric pressure. About 10 parts of hexamethyldisilazane was added and the mixture was heated for about 2 hours at 140° C. About ½ part of water in the form of steam was added and mixing was continued for an additional hour at 140° C. The filler was devolatilized using a nitrogen purge until the NH$_3$ content of the filler was less than 50 p.p.m.

The weight percent of trimethylsiloxy units on the fume silica filler was calculated by elemental analysis for carbon and hydrogen by measuring weight percent in terms of carbon dioxide by standard analytical techniques.

A room temperature vulcanizing organopolysiloxane composition was prepared by mixing together under substantially anhydrous conditions, 33 parts of the treated filler having about 6.5 percent by weight of chemically combined trimethylsiloxy units and free of infrared absorbance at 3,760 cm.$^{-1}$, 100 parts of a polydimethylsiloxane fluid having terminal silanol radicals and tertiary butoxy radicals and a viscosity of about 3,000 centipoises at 25° C. and 6 parts of a process aid consisting essentially of chemically combined trimethylsiloxy units, dimethylsiloxy units, and methylsiloxy units.

The ratio of silanol radicals to tertiary butoxy radicals in the silanol-containing polydimethylsiloxane had a value of 2.76. The process aid employed was composed of about 2.9 mole percent of trimethylsiloxy units chemically combined with 19.9 mole percent of methylsiloxy units and 77.2 mole percent of dimethylsiloxy units, based upon the total number of siloxy units in the process aid and 0.5 percent by weight of hydroxy radicals attached to silicon based upon the weight of the process aid.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.06 percent by weight of dibutyl tin dilaurate based upon the weight of the mixture. The above-described room temperature vulcanizing organopolysiloxane composition containing the treated filler was pressed onto a chrome-plated steel mold to a thickness of 75 mm. and allowed to cure under atmospheric conditions.

Elastomeric sheets were obtained from the room temperature vulcanizing organopolysiloxane composition after they were allowed to cure 72 hours under atmospheric conditions. The following table shows the results obtained where "H" is hardness (shore A), "T" is tensile (p.s.i.), "E" is elongation (percent), and "T'" is tear strength (p.i.):

| H | T | E | T' |
|---|---|---|---|
| 33 | 840 | 600 | 170 |

What I claim as new and desire to secure by Letters Patent of the United States is:

1. The process comprising contacting at a temperature of 15° to 170° C.,
   a. a finely divided silica having a surface area of at least 50 square meters per gram and containing at least 0.2 weight percent of absorbed water based upon the weight of the silica with
   b. a member selected from the group consisting of ammonia, primary amines and aminoxy compounds, and then contacting the silica at a temperature of from 20° to 150° C. with from 3 to 25 percent by weight based upon the weight of the silica of a silylating agent of the formula, $$(R_3Si)_aZ$$

where R is selected from the group consisting of mononuclear and binuclear aryl radicals, halogenated mononuclear and binuclear aryl radicals, mononuclear aryl lower alkyl radicals, lower alkyl radicals, lower alkenyl radicals, halo lower alkyl radicals, and cycloalkyl radicals; $a$ is an integer equal to 1 or 2 and Z is a radical selected from the group consisting of $-NR_2$ and $$-\underset{\underset{\text{X}}{|}}{\text{N}}-,$$

where X is selected from the group consisting of H and R where R is as above defined.

2. A process of claim 1, wherein the silica filler has a surface area of 150 to 500 square meters per gram.

3. A process of claim 1, wherein the contacting agent is ammonia.

4. A process of claim 1, wherein the finely divided silica is treated with an alkylcyclopolysiloxane.

5. A process of claim 1, wherein Z is selected from the group consisting of $-N-$ and $-NR_2$, where X is selected from the group consisting of H and R where R is as above defined.

6. A process of claim 1, wherein the silylating agent is a silazane.

7. A treated pyrogenic silica filler produced by the process of claim 1, having a surface area of at least 50 square meters per gram and substantially free of infrared absorbance at 3,760 cm.$^{-1}$, containing from 1 to 20 percent by weight of chemically combined triorganosiloxy units of the formula $R_3SiO$, where R is selected from the group consisting of mononuclear and binuclear aryl radicals, halogenated mononuclear and binuclear aryl radicals, lower alkyl radicals, lower alkenyl radicals, halo lower alkyl radicals and cycloalkyl radicals.

8. A filler of claim 7, wherein R is methyl.

9. A filler of claim 7, containing from 6 to 20 percent by weight of chemically combined triorganosiloxy units.

10. A filler of claim 7, containing from 6 to 12 percent by weight of trimethylsiloxy units.

* * * * *